United States Patent
Kroll et al.

(10) Patent No.: US 7,805,158 B2
(45) Date of Patent: Sep. 28, 2010

(54) SELF DEFENSE CELL PHONE WITH ACCELERATION SENSOR AND EMERGENCY CALL BUTTON

(75) Inventors: Chase Kroll, Crystal Bay, MN (US);
Mark W. Kroll, Crystal Bay, MN (US)

(73) Assignee: Kroll Family Trust, Crystal Bay, MN (US)

( * ) Notice: Subject to any disclaimer, the term of this patent is extended or adjusted under 35 U.S.C. 154(b) by 100 days.

(21) Appl. No.: 12/353,471

(22) Filed: Jan. 14, 2009

(65) Prior Publication Data
US 2009/0124231 A1    May 14, 2009

Related U.S. Application Data

(63) Continuation of application No. 10/219,848, filed on Aug. 14, 2002, now Pat. No. 7,483,715, which is a continuation-in-part of application No. 09/584,326, filed on May 30, 2000, now Pat. No. 6,580,908, which is a continuation-in-part of application No. 08/895,358, filed on Jul. 16, 1997, now Pat. No. 6,115,597.

(51) Int. Cl.
*H04M 11/04* (2006.01)

(52) U.S. Cl. .................................. 455/550.1; 370/310

(58) Field of Classification Search ................. 370/310, 370/328, 338; 455/418, 521, 550.1, 566, 455/567
See application file for complete search history.

(56) References Cited

U.S. PATENT DOCUMENTS

| | | |
|---|---|---|
| 4,486,807 A | 12/1984 | Yanez |
| 5,388,603 A | 2/1995 | Bauer |
| 5,429,301 A | 7/1995 | Franks |
| 5,476,192 A | 12/1995 | Julinot |
| 5,578,992 A | 11/1996 | Harding |
| 5,786,546 A | 7/1998 | Simson |
| 5,986,872 A | 11/1999 | Chaput |
| 5,988,450 A | 11/1999 | Cassarino |
| 6,044,257 A | 3/2000 | Boling |
| 6,052,051 A | 4/2000 | Whalen |

*Primary Examiner*—Sam Bhattacharya
(74) *Attorney, Agent, or Firm*—Vidas, Arrett & Steinkraus (57) ABSTRACT

The present invention teaches an economical disposable emergency cellular telephone. A major object of this invention is a shocking self-defense capability. A further object is a cell phone which launches projectiles to deliver the shocking voltage. A further object of the invention is a new technique for having a large number of cellular phones share the same small group of access numbers and serial numbers in order to reduce the monthly charges to zero for the end consumer. This makes it more practical to use cellular phones for data transmission and monitoring applications.

12 Claims, 13 Drawing Sheets

Side View  Front View

Side View                Front View

FIG. 12

SELF DEFENSE CELL PHONE WITH ACCELERATION SENSOR AND EMERGENCY CALL BUTTON

This application is a continuation of Ser. No. 10/219,848 filed on Aug. 14, 2002 issuing as U.S. Pat. No. 7,483,715, which is a continuation-in-part of "Generic Number Cellular Telephone" Ser. No. 09/584,326 filed on May 30, 2000 issued as U.S. Pat. No. 6,580,908 which was a continuation-in-part of U.S. Ser. No. 08/895,358 filed Jul. 16, 1997, "Disposable Emergency Cellular Phone" now issued as U.S. Pat. No. 6,115,597.

BACKGROUND OF THE INVENTION

As the cell phone is often used as an emergency communication device it would be useful to combine the cell phone with some sort of personal defense system such as a stun gun that made synergistic use of the battery and antenna of the phone. This has never been done. The patent of Cassarino U.S. Pat. No. 5,988,450 teaches a cell phone and various self-defense packages put together in one box with no synergistic communication. He includes pepper sprays and a taser. This teaches away from the instant invention. Similarly the patent of Julinot U.S. Pat. No. 5,476,192 teaches a pepper spray device disguised to look like a cell phone. This also teaches away from the instant invention.

SUMMARY OF THE INVENTION AND DETAILED DESCRIPTION

Figure 1A:
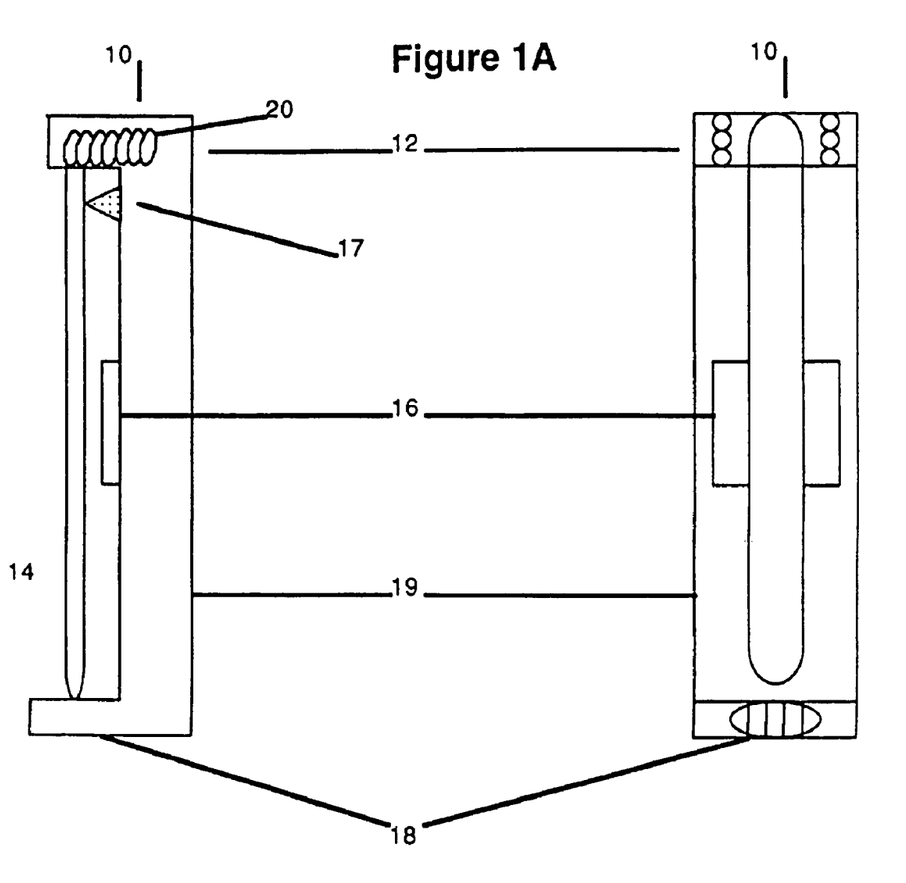
FIGS. 1a and 1b show a front and side view of the phone with the antenna collapsed.
Figure 1B:
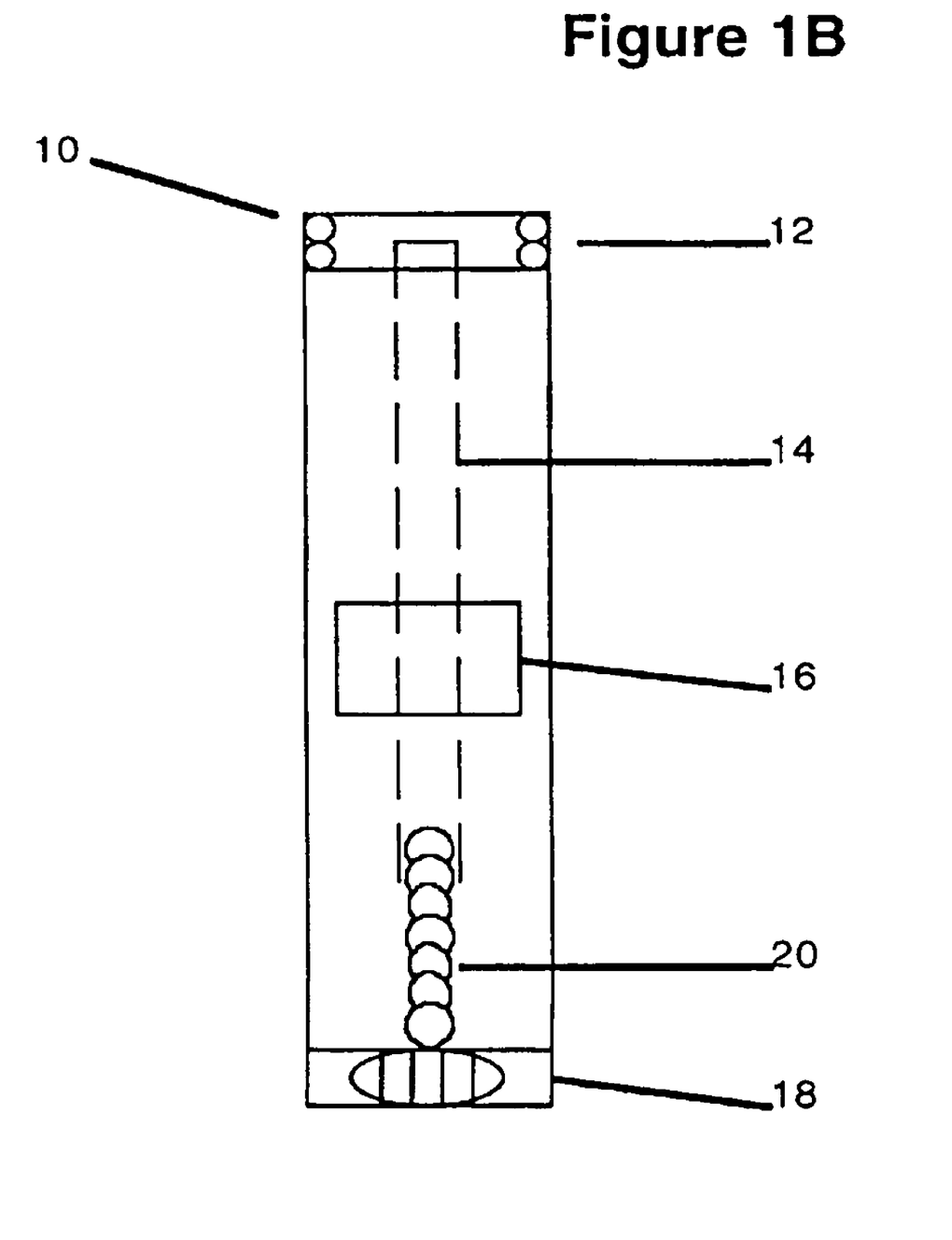

FIG. 1 depicts the phone with the antenna collapsed from a side and front view. The basic mechanical components of the phone 10 are the speaker and speaker section 12, the antenna 14, and the microphone section 18. The center section 19 carries the batteries and the electronics. It also serves as the base for the "911" button 16.

A spring 20 to automatically deploy the antenna is shown in the speaker section. In an alternative embodiment, the antenna is slid down into the phone body with a linear spring. When the 911 button is pushed, it releases the antenna, which then slides out the end into a fully extended position when released.

In one embodiment, the whole phone is made waterproof through the use of waterproof switches, microphone, and speakers.

Figure 2:
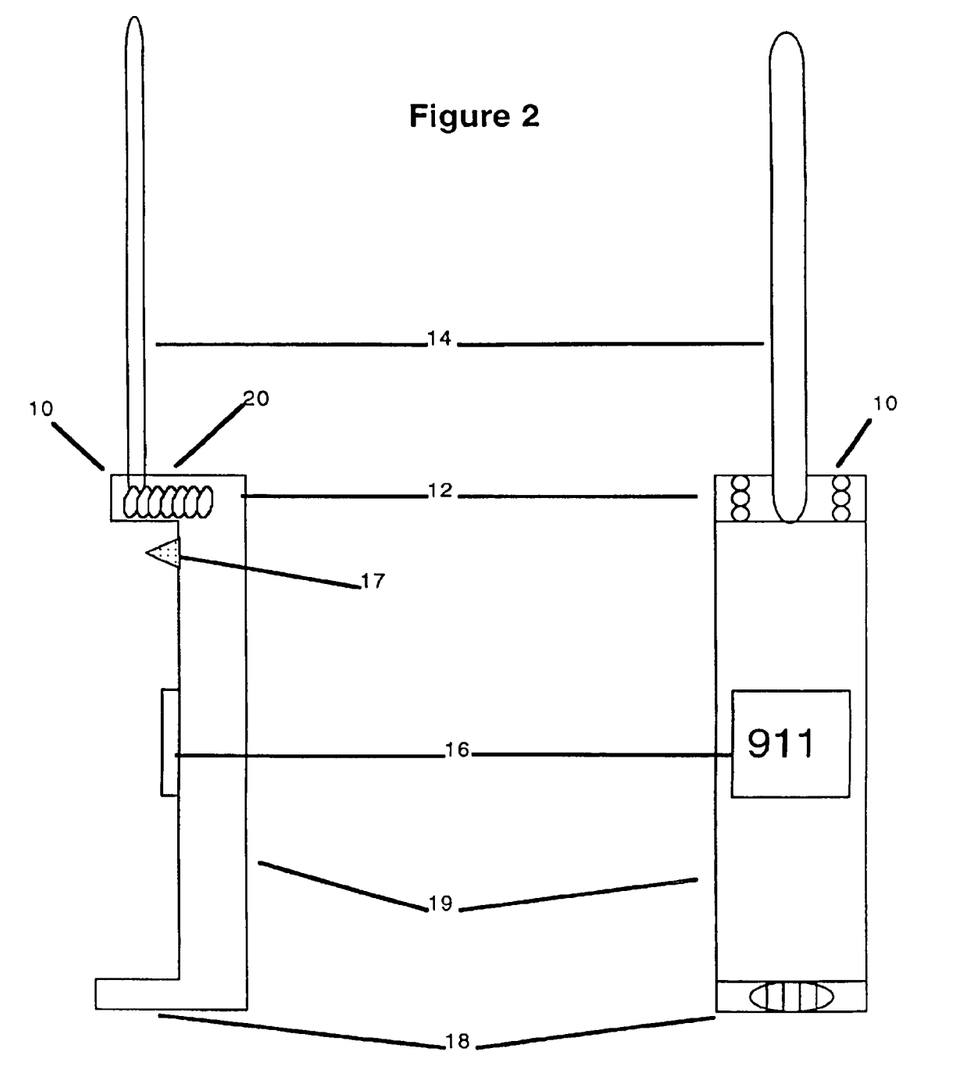
FIG. 2 shows the side and front views of the phone with the antenna extended.

FIG. 2 shows the identical components but with the antenna extended. The operation of the spring is such that the antenna is normally fully extended.

Figure 3:
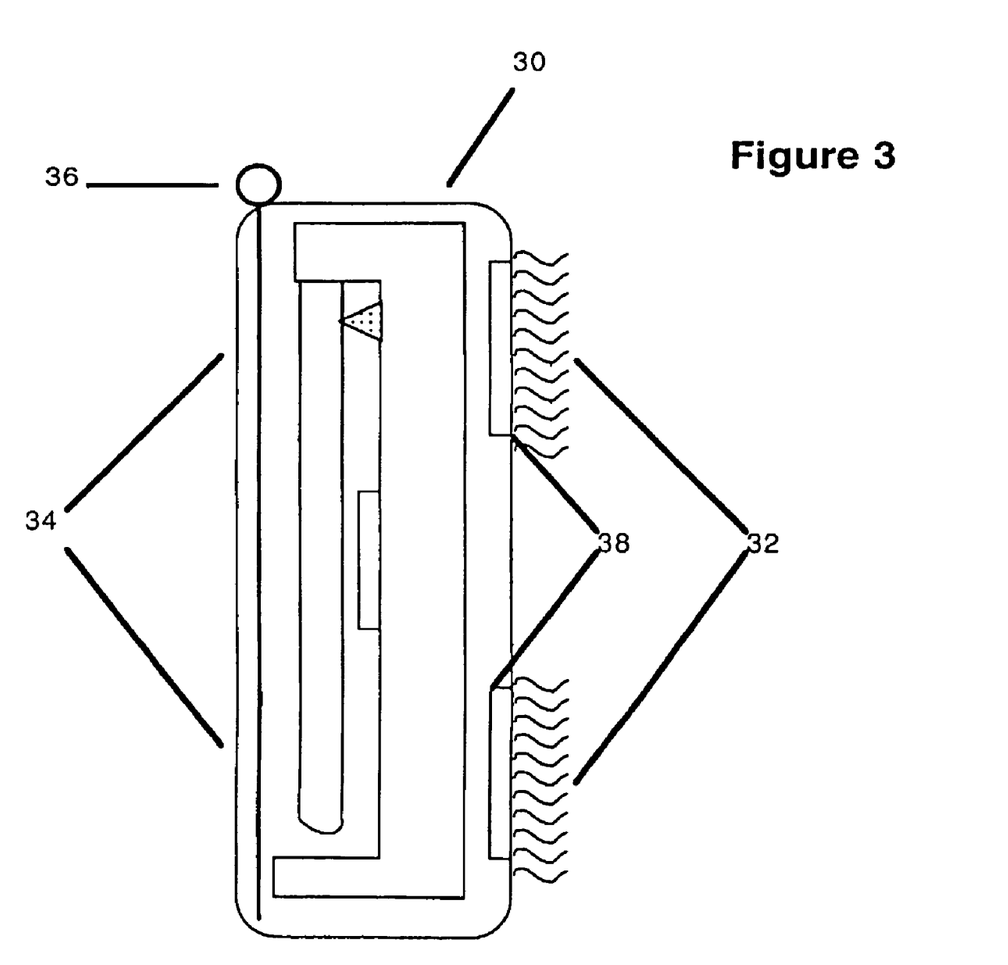
FIG. 3 shows the phone in its waterproof storage pouch.

FIG. 3 shows the phone of this embodiment in its weatherproof pouch 30. This pouch could be made of any water or weatherproof material including vinyl, polycarbonates or other polymers. Along the front end of the pouch 30 is an embedded quick release strip 34, which has a brightly colored large pull tab 36. For use of the phone the tab 36 is gripped and pulled down the complete length of release line 34 to open the pouch and access the phone. This then automatically deploys the antenna due to the operation of the integral spring.

On the back of the phone pouch 30 is an attachment means. In the preferred embodiment this is shown as a Velcro® type of mechanism 32. Alternatively it could be suction cups for glass or adhesives for metal. Further alternatives would include magnets for metal. The Velcro® works particularly well for the roof cloth or floor carpeting of many cars. Yet another alternative attachment mechanism would be a combination of Velcro® and magnet for universal attachment as shown using the magnets 38 embedded in the pouch.

The pouch is transparent to make the phone contents very obvious in an emergency situation.

Figure 4:
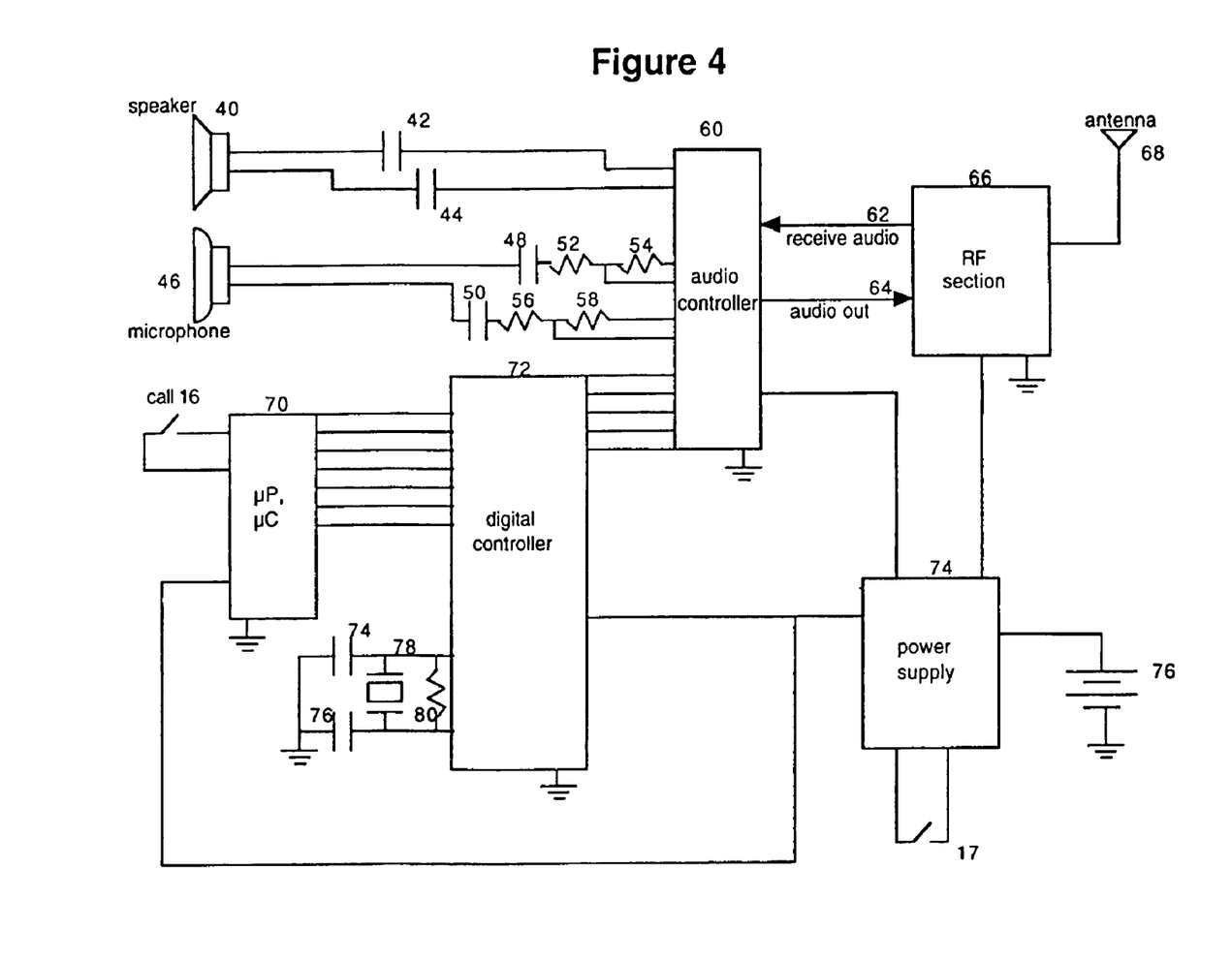
FIG. 4 shows the basic circuitry for the phone.

Due to the presence of dedicated integrated circuits the electronic portion of a conventional cellular phone design is doable by anyone skilled in the art of electrical engineering. The circuit in FIG. 4 is meant to be broadly illustrative. The circuitry is not meant to be in great detail as that is no longer necessary with this art. Speaker 40 is coupled through capacitors 42 and 44 to audio controller 60. The audio controller 60 receives a demodulated audio line 62 from the RF section chip 66. That RF section chip receives the RF signal from antenna 68. Microswitch 17 is shown connected to the power supply chip for automatically turning on the phone after the antenna is deployed as shown in FIGS. 1 and 2.

Microphone 46 is coupled through capacitors 48 and 50 and resistors 52, 54, 56, and 58 into the audio controller 60. The audio controller then sends the "audio out" signal on line 64 into the RF section 66 for final transmission out on antenna 68. When the call button 16 is depressed the microprocessor microcontroller 70 interprets this and activates the appropriate sequences and the digital controller 72 would then give the appropriate controls to the audio controller 60. Digital controller 72 is clocked by a crystal oscillator comprising capacitors 74 and 76, crystal 78, and resistor 80.

All of the electronic components are powered by battery 76 through the power supply chip 74.

A representative audio controller is the TCM 8010 of Texas Instruments, P.O. Box 655303, Dallas, Tex. 75265. A representative RF section IC is the TRF 1015 from Texas Instruments. There are numerous manufacturers of microprocessors or microcontrollers. Sample devices are the 8051 or 8032 available from numerous electronic manufacturers. A representative of the digital controller is the TCM 8002 from Texas Instruments. Representative power supply ICs are the TPS9013 or the TPS9104, both of Texas Instruments.

The battery 76 is a permanently installed primary cell such as an alkaline, lithium, or manganese dioxide cell although many other types could work. The cell must provide high peak currents in transmission but otherwise is not required to have extremely high longevity. By having a permanent primary cell there is an economy over the use of an expensive rechargeable cell and also over the use of a changeable primary cell due to the expense of the battery holders chambers and doors. These battery holders, chambers, and doors for a battery chamber also introduce reliability problems. As an alternative embodiment the battery could be a fixed or removable thermal battery or any practical battery.

Figure 5:
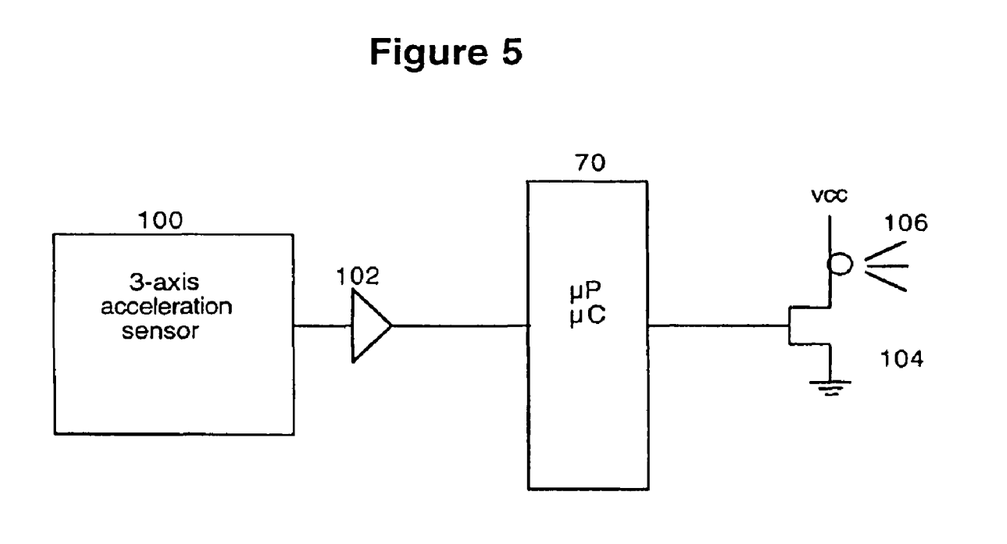
FIG. 5 shows the circuitry modifications for the automatic crash response feature.

Microswitch 17 is activated by the antenna springing out and thus automatically turning on the device. FIG. 5 depicts the circuit modifications to allow for the automatic crash activation feature. The three-axis acceleration sensor 100 will detect the sudden acceleration from a crash and pass this on to three-channel amplifier 102 and then on to the microprocessor and microcontroller 70. If a sufficient force is detected then the device will turn on automatically and begin pulsing through transistor 104 to pulse integral light 106. The light 106 is also used to light up the 911 button after the antenna is deployed. The microprocessor microcontroller will also signal the rapid beeping through the phone speaker 40, which is shown in FIG. 4.

If the phone is not operated within 5 minutes of the "crash" then it automatically turns off to save battery life. Alternatively the phone could include a "hang-up" button which could also stop the flashing and pulsing.

Suitable acceleration sensors are available from Analog Devices of Norwich, Mass.

Figure 6:
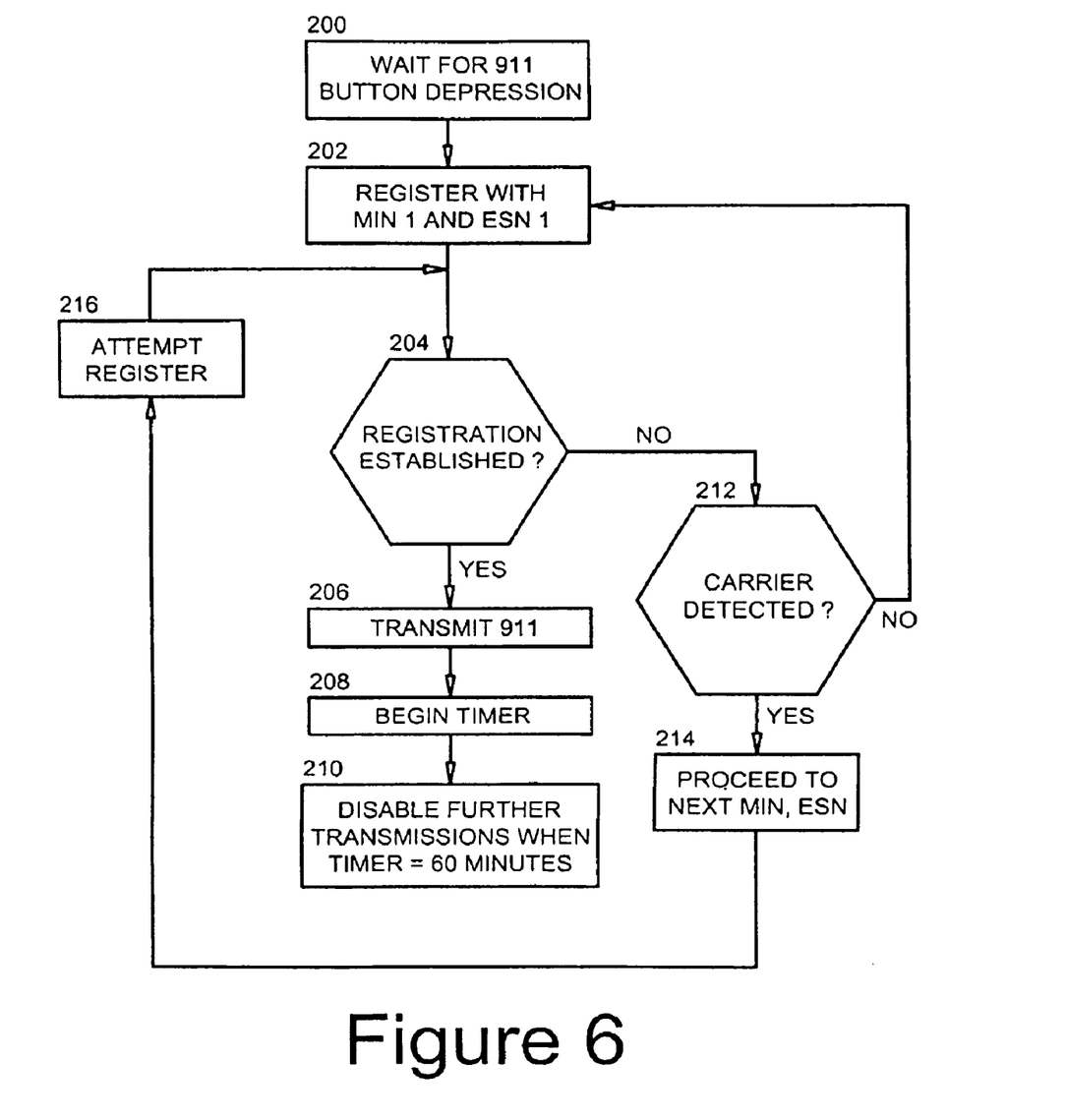
FIG. 6 shows the registration process to allow the user to bypass a monthly access fee.

FIG. 6 shows the flow chart for the operation of the phone with particular attention to the unique feature that allows the operation of the phone without the customer having to pay a monthly access fee for a private number.

The provider (distributor) of the disposable emergency cellular phones will pay a monthly fee for a few phone numbers. Each of these phone numbers (mobile identification number [MIN]) comes with an electronic serial number (ESN) which will be transmitted with the MIN in order to register to the cellular system. (A conventional cellular phone also transmits its MIN and a unique ESN, which it registers. The ESN is unpublished and is matched with the phone to minimize fraudulent usage.) One feature of this invention is that thousands of the disposable emergency phones could share a small set of MINs and matching ESNs.

Assume that the average call requires 5 minutes. The table below gives the number of MINs required for a smoothed (average) load as a function of the number of subscribers. The last column gives the estimated number of MINs required to reduce waits as call volume will not be perfectly constant.

1 number of MINs needed for MINs needed to subscribers average load minimize waits 100 1 3 200 1 5 500 2 8 1,000 4 12 2,000 7 17 5,000 18 30 10,000 35 49 20,000 70 85 50,000 174 190 100,000 348 364 200,000 695 712 500,000 1,737 1,753 1,000,000 3,473 3,490 2,000,000 6,945 6,962 5,000,000 17,362 17,378 10,000,000 34,723 34,740

In operation, the first step is to wait for the 911 button depression 200. Step 202 is to register with a MIN and ESN. Step 204 is to verify that registration (log on) is established. If it is established then the method proceeds on to step 206 which is to transmit the 911 number. Then step 208 begins a timer. Finally, at step 210 the device will disable further transmissions when the timer reaches 60 minutes. In an alternative embodiment, a counter is used to limit the number of 911 calls to a small fixed number, say 5. The total talking time would then be limited only by the battery life and the patience of the 911 operators. If at step 204 registration was not established then the method proceeds to step 212, which is to verify that a carrier signal is present. If no carrier is detected then the method returns to step 202 to attempt registration again. If the carrier is detected then the method proceeds to step 214 and increments to the next MIN (phone number) and ESN (serial number). It then attempts another registration in step 216. The reason for the attempt for different numbers is that it is conceivable that two customers would both be trying to make a 911 call at the exact same time. Were that to occur, the first caller would normally lock out that number nationwide and prevent the second caller from getting through. Thus a disposable cellular phone provider would have a few numbers that a minimal monthly service fee is paid for. The system could try the MINs and ESNs (phone and serial numbers) in a fixed sequence or a random fashion.

Alternatively the phone could simply log on with a public phone number and transmit a 311 or 911 call since the FCC requires phone companies to accept 311 and 911 calls regardless of the account status.

Figure 7:
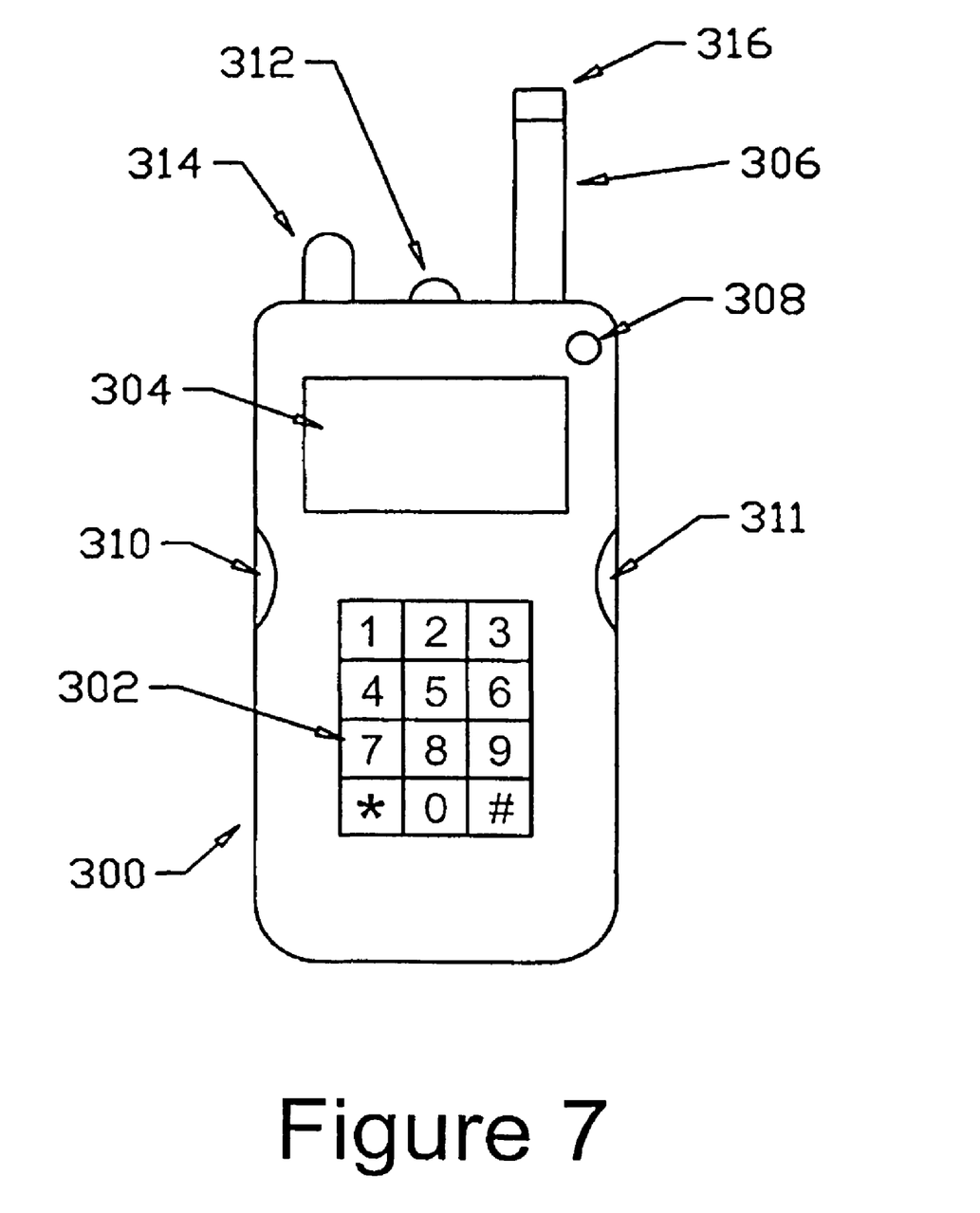
FIG. 7 shows the physical embodiment of the stun gun version of the cell phone.

FIG. 7 shows the physical embodiment of the stun gun in this version of the cell phone. The basic phone 300 has a conventional key pad 302 and read-out display 304 along with the antenna 306. There is also the on-off button 308 as standard.

There is a left side high (mechanical) resistance push button 310 to enable the flashlight. Also there is a right side push button 311 to enable the electrical stunning operation when used in conjunction with the switch 310. When the flashlight is enabled then the battery from the cell phone is connected to high intensity light bulb 312. When both switches 310 and 311 are enabled simultaneously a high voltage is developed between the pseudo antenna tip 314 and the tip of the normal antenna 316. The angle between the tips 314 and 316 is very important as it allows the shock to be delivered from the operator's right hand and angled to attack the arm or hand of an attacker without having to have a full perpendicular contact.

Figure 8:
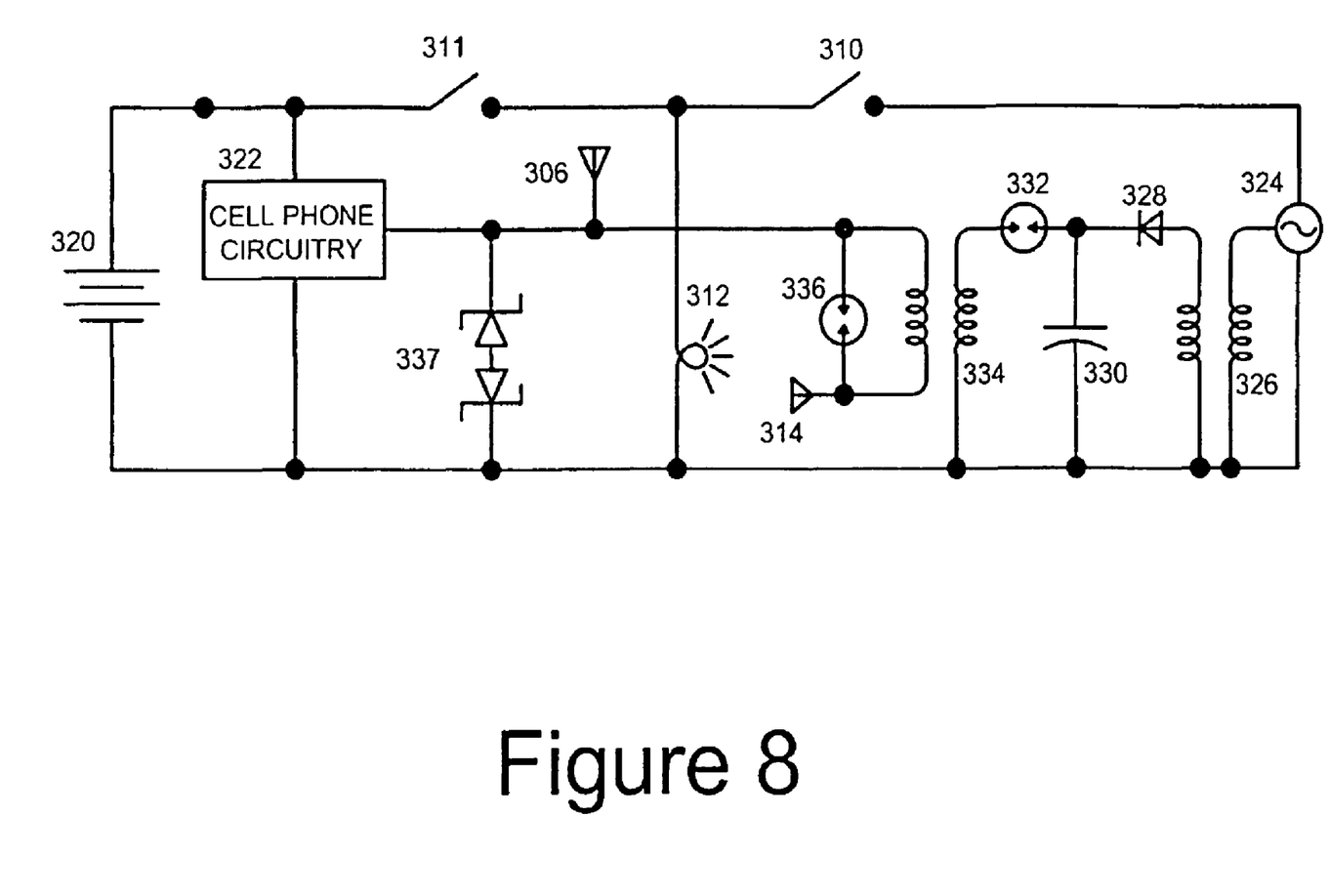
FIG. 8 shows the electrical circuitry of the stun gun cell phone.

FIG. 8 shows the synergistic operation of the circuitry. We begin with the battery 320, which is connected to the conventional cell phone circuitry 322, which then drives the conventional antenna 306 for transmission. When switch 311 is depressed then the battery power 320 is delivered directly to the light bulb 312 to cast an intense beam.

When both switches 311 and 310 are depressed then battery current is delivered to oscillator 324. Oscillator 324 provides an AC current to transformer 326 which develops a high voltage output which is rectified by diode 328 and stored in capacitor 330. In this way a voltage is built up to over 1000 volts on capacitor 330. When the voltage exceeds 1000 volts on capacitor 330 then the hermetically sealed spark gap 332 will break down and deliver a short intense current through transformer 334. The output of transformer 334 (of about 25,000 to 50,000 volts) will then appear between contacts 306 (which is the conventional antenna) and 314 which is the shocking probe "pseudo antenna." The hermetically sealed spark gap 336 limits that voltage to prevent damage to the circuitry. The Zener diodes 337 serve to protect the cell phone circuitry from the effects of this high voltage and keep the antenna 306 closer to a ground potential.

Figure 9:
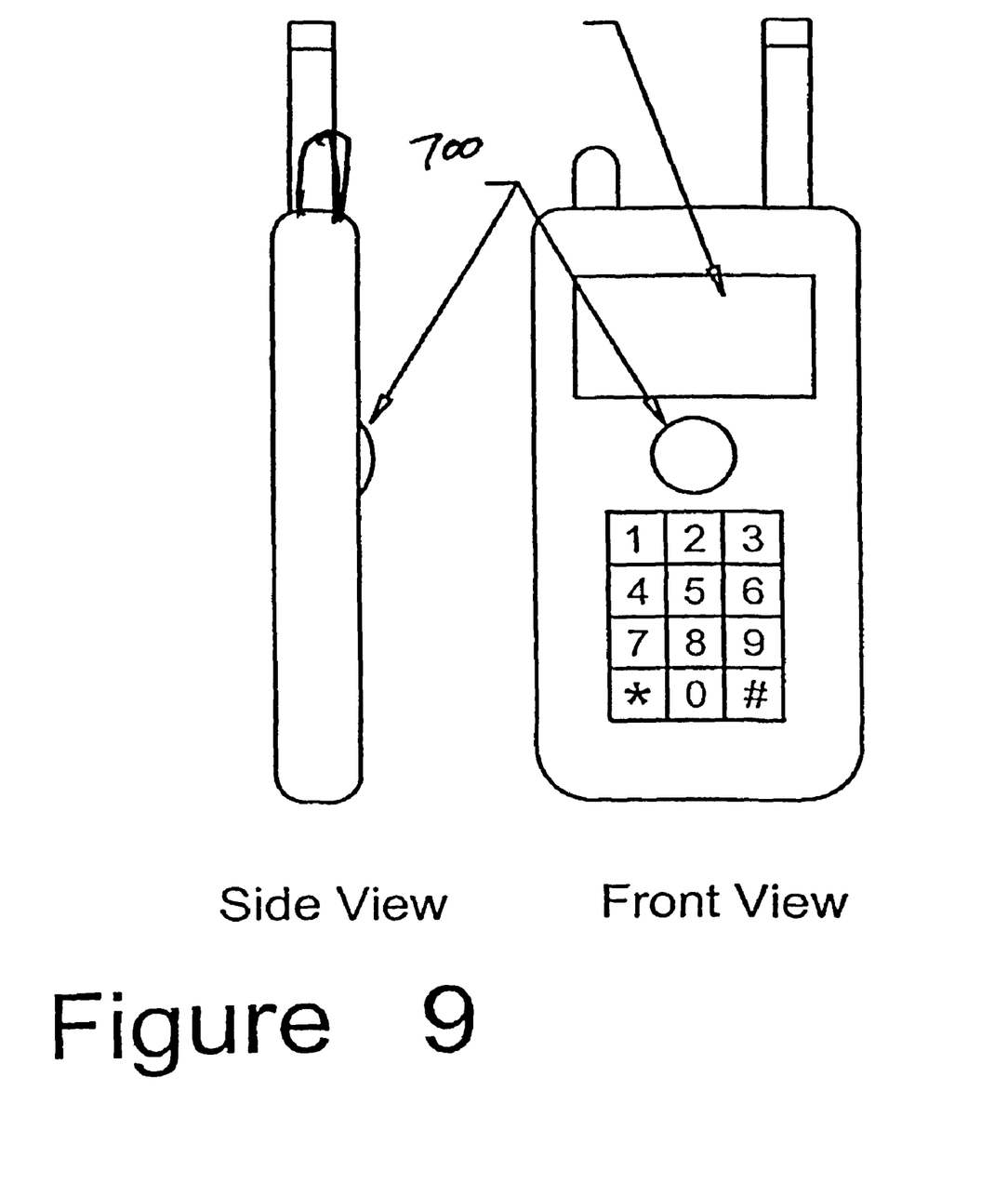
FIG. 9 shows the high position for the safety of the stun gun cell phone.

FIG. 9 shows the high location of the safety switch. In order to enable the shocking circuitry the operator must depress the round switch 700 hard. This is difficult to do if the phone face is against the side of the head as it would be for normal phone usage. Thus this configuration reduces the risk of the operator shocking herself. The switch 700 could require a second operation of lifting a hood over it before it could be depressed. This would provide a double safety feature.

Figure 10:
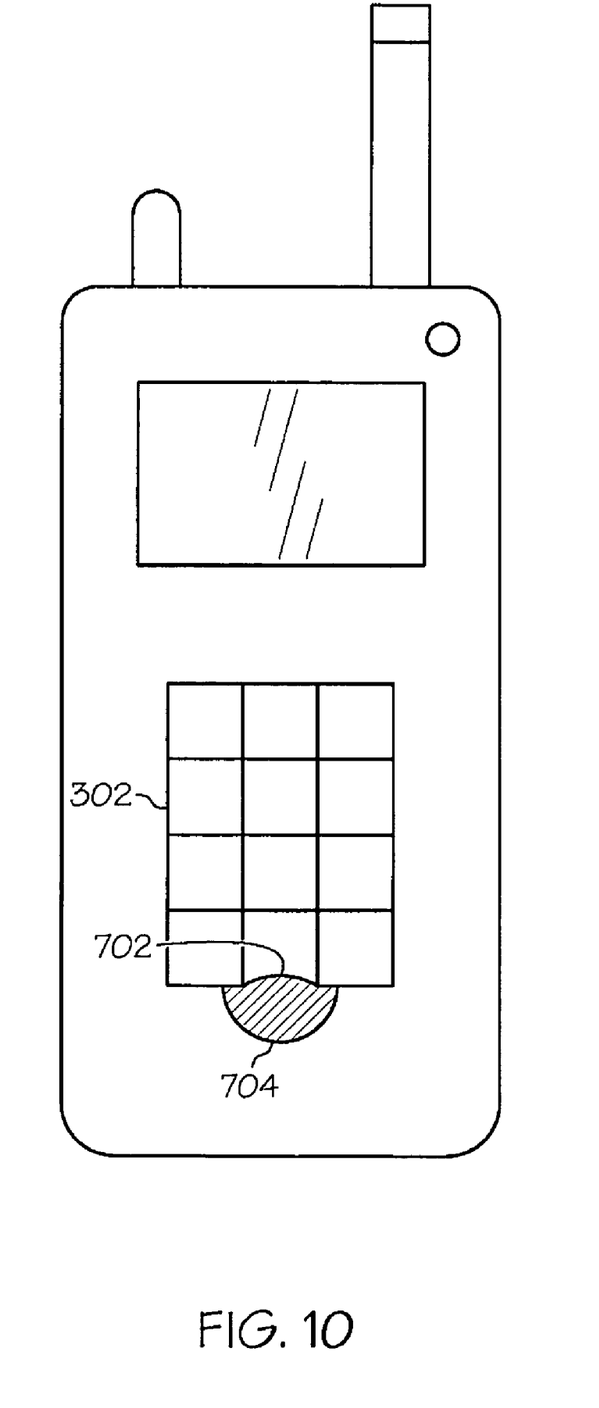
FIG. 10 shows a low position for the safety of the stun gun cell phone.

FIG. 10 shows a low position for a safety tip 702. Here the thumb end must actually lift the safety hood at the bottom of the keypad. Once the hood is lifted, the thumb must depress the internal switch 704 to generate the shock.

Figure 11:
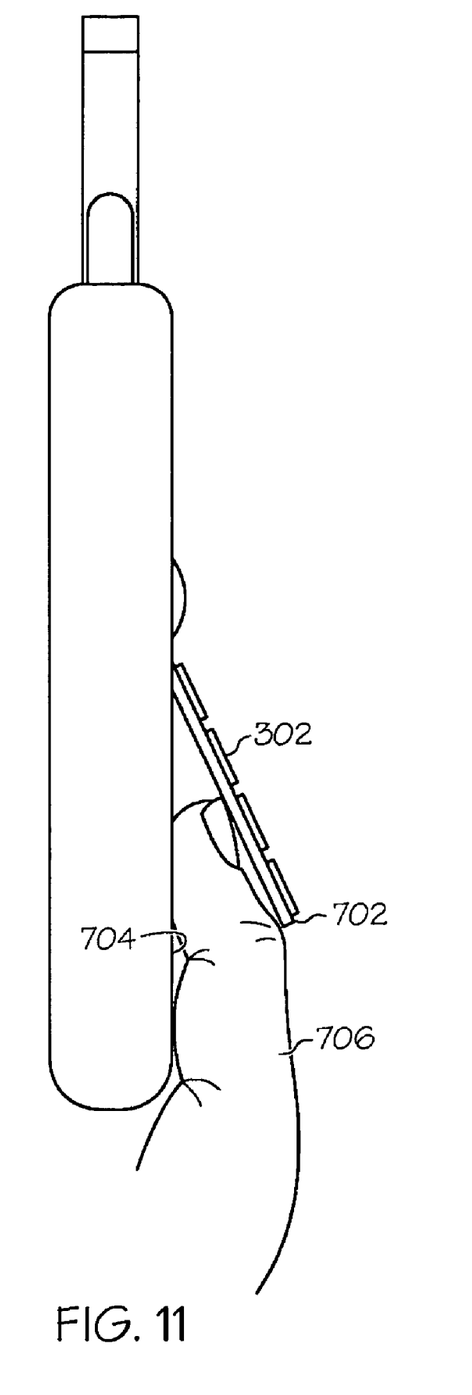
FIG. 11 shows a side view of the low position for the safety of the stun gun cell phone.

FIG. 11 shows the side view of the low position safety in operation. Here keyboard 302 is lifted by the thumb 706 being inserted under the lip 702. The thumb then depresses switch 704 to activate the shocking circuitry.

Figure 12:
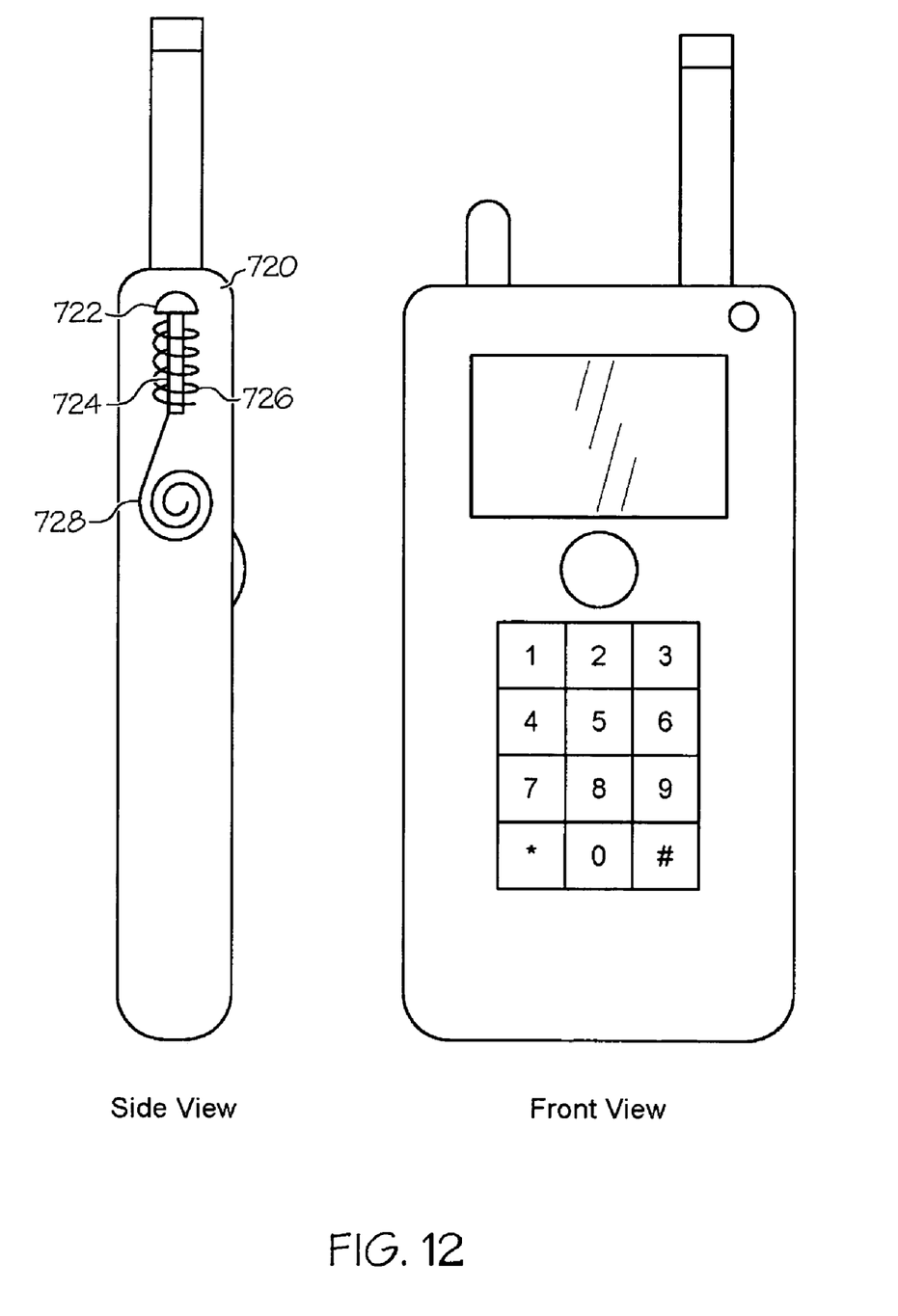
FIG. 12 shows the shocking launching barbs embodiment of the stun gun cell phone

FIG. 12 shows the embodiment using launched barbs. The barb mechanism 720 consists of a head 722 and a shaft 724 connected to a coiled loop of fine wire 728. The barb is launched by coil spring 726 upon command of the operator. The barbs are released either by a mechanical latch movement driven directly by the shock delivery switch or by a solenoid controlled by the switch. The voltage sources are node 314 and the bottom "common" line in FIG. 8.

We claim:

1. A cellular phone comprising:
a communications antenna having a deployed position;
a microswitch having an activated position, and being in said activated position when said communications antenna is in said deployed position;
a power source;
a three-axis acceleration sensor configured to detect a sudden acceleration;
an emergency call button; and
a light source, wherein when said three-axis acceleration sensor detects a sudden acceleration, said light source illuminates said emergency call button.

2. The cellular phone of claim 1, wherein said power source comprises a primary cell battery.

3. The cellular phone of claim 2 wherein said primary cell battery comprises an alkaline, lithium, or manganese dioxide cell battery.

4. The cellular phone of claim 1, wherein said communications antenna further comprises an undeployed position and said microswitch comprises an inactivated position, and wherein when said communications antenna is in said undeployed position said microswitch is in said inactivated position.

5. The cellular phone of claim 4 further comprising a linear spring, wherein said linear spring is configured to deploy said communications antenna from said undeployed position to said deployed position.

6. The cellular phone of claim 4, wherein when said emergency call button is depressed, said communications antenna is deployed from said undeployed position to said deployed position.

7. The cellular phone of claim 1 further comprising a speaker.

8. The cellular phone of claim 7, wherein when said three-axis acceleration sensor detects a sudden acceleration, said speaker emits a sound.

9. The cellular phone of claim 1 further comprising a self-defense shocking apparatus electrically connected to said shared power source.

10. The cellular phone of claim 9, wherein said power source is the sole source of power for said cellular phone.

11. The cellular phone of claim 10, wherein the phone is waterproof.

12. A cellular phone comprising:
a communications antenna having a deployed position;
a microswitch having an activated position, and being in said activated position when said communications antenna is in said deployed position;
a singular power source;
a three-axis acceleration sensor configured to detect a sudden acceleration; and
an emergency call button.

* * * * *